(12) United States Patent
Xu et al.

(10) Patent No.: US 9,959,052 B1
(45) Date of Patent: May 1, 2018

(54) MEDIA BASED CACHE FOR DATA STORAGE DEVICE

(71) Applicant: Western Digital Technologies, Inc., Irvine, CA (US)

(72) Inventors: Jun Xu, Singapore (SG); Wei Xi, Mission Viejo, CA (US); Guoxiao Guo, Irvine, CA (US); Jianyi Wang, Singapore (SG); Junpeng Niu, Singapore (SG)

(73) Assignee: Western Digital Technologies, Inc., San Jose, CA (US)

( * ) Notice: Subject to any disclaimer, the term of this patent is extended or adjusted under 35 U.S.C. 154(b) by 179 days.

(21) Appl. No.: 14/857,467

(22) Filed: Sep. 17, 2015

(51) Int. Cl.
*G06F 12/00* (2006.01)
*G06F 3/06* (2006.01)
*G06F 12/0871* (2016.01)
*G06F 12/0815* (2016.01)

(52) U.S. Cl.
CPC ............. *G06F 3/061* (2013.01); *G06F 3/065* (2013.01); *G06F 3/0659* (2013.01); *G06F 3/0689* (2013.01); *G06F 12/0815* (2013.01); *G06F 12/0871* (2013.01)

(58) Field of Classification Search
CPC ...... G06F 3/061; G06F 3/0689; G06F 3/0659; G06F 12/0871; G06F 12/0815
See application file for complete search history.

(56) References Cited

U.S. PATENT DOCUMENTS

| | | | |
|---|---|---|---|
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |

(Continued)

OTHER PUBLICATIONS

Edwin S. Olds, et al., U.S. Appl. No. 14/188,453, filed Feb. 24, 2014, 23 pages.

(Continued)

*Primary Examiner* — Gurtej Bansal
(74) *Attorney, Agent, or Firm* — Barry IP Law

(57) ABSTRACT

Write commands are received for a Data Storage Device (DSD) to store write data in a plurality of corresponding write locations on at least one disk of the DSD. At least a portion of the write data is cached in at least one Media Based Cache (MBC) region of the at least one disk based on a write cache policy for determining which write data is eligible for caching in the at least one MBC region. The at least one MBC region is used to cache data to be stored in other locations on the at least one disk. During an active time period when host commands are performed on the at least one disk, a portion of an I/O bandwidth for performing commands is used to copy the at least a portion of the write data to corresponding write locations of the plurality of corresponding write locations.

33 Claims, 9 Drawing Sheets

(56) References Cited

U.S. PATENT DOCUMENTS

| | | |
|---|---|---|
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,446,156 B1 | 9/2002 | Chia et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian |
| 6,892,313 B1 | 5/2005 | Codilian |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |

(56) References Cited

U.S. PATENT DOCUMENTS

| | | |
|---|---|---|
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,461,202 B2 | 12/2008 | Forrer, Jr. et al. |
| 7,471,483 B1 | 12/2008 | Ferris et al. |
| 7,471,486 B1 | 12/2008 | Coker et al. |
| 7,472,222 B2 * | 12/2008 | Auerbach ............ G06F 1/3221 711/112 |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |

(56) References Cited

U.S. PATENT DOCUMENTS

| | | |
|---|---|---|
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,639,872 B1 * | 1/2014 | Boyle .................. G06F 12/0871 711/103 |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,775,720 B1 | 7/2014 | Meyer et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 2009/0113702 A1 | 5/2009 | Hogg |
| 2010/0146205 A1 | 6/2010 | Baum et al. |
| 2010/0306551 A1 | 12/2010 | Meyer et al. |
| 2011/0119442 A1 | 5/2011 | Haines et al. |
| 2011/0161557 A1 | 6/2011 | Haines et al. |
| 2011/0191534 A1 * | 8/2011 | Ash .................. G06F 12/0804 711/113 |
| 2011/0226729 A1 | 9/2011 | Hogg |
| 2012/0159042 A1 | 6/2012 | Lott et al. |
| 2012/0162237 A1 * | 6/2012 | Chung .................. G09G 5/39 345/532 |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2014/0068178 A1 | 3/2014 | Fisher et al. |
| 2014/0201424 A1 | 7/2014 | Chen et al. |
| 2014/0281229 A1 | 9/2014 | Kowles |

OTHER PUBLICATIONS

Wayne H. Vinson, et al., U.S. Appl. No. 14/728,293, filed Jun. 2, 2015, 30 pages.

T. Nightingale, Y. Hu and Q. Yang, The design and implementation of a DCD device for unix, USENIX, ATEC '99, 1999.

Y. Hu and Q. Yang, A new hierarchical disk architecture, IEEE Micro, vol. 18 Issue 6, Nov. 1998.

T. Chiueh and L. Huang, Trail: A fast synchronous write disk subsystem using track-based logging, Tech report TR-105, State Univ of New Year at Stony Brook, 2002.

Chiueh and L. Huang, Track-based disk logging, IEEE Conf. on Dependable Systems and Networks, 2002, pp. 429-438.

* cited by examiner

| Zone 0 | Zone 1 | | Zone N |
|---|---|---|---|
| Data Track 0 | Data Track 0 | | Data Track 0 |
| MBC Track 0 | Data Track 1 | . . . | MBC Track 0 |
| Data Track 1 | MBC Track 0 | | Data Track 1 |
| Data Track 2 | Data Track 2 | | Data Track 2 |
| ⋮ | ⋮ | | ⋮ |

FIG. 2C

| Zone 0 | Zone 1 | | Zone N |
|---|---|---|---|
| Data Track 0 | Data Track 0 | | Data Track 0 |
| MBC Track 0 | Data Track 1 | . . . | MBC Track 0 |
| Data Track 1 | MBC Track 0 | | Data Track 1 |
| Data Track 2 | MBC Track 1 | | Data Track 2 |
| ⋮ | ⋮ | | ⋮ |

FIG. 2D

| LBA | PBA (Zone ID; SABN) | Valid |
|---|---|---|
| 1,000-2,000 | 0; 2,301 | 1 |
| 200-299 | 0; 11,900 | 1 |
| 300-302 | 1; 0 | 0 |

FIG. 3A

| Track ID | Zone ID | Track No. | Blocks (SPT) | Valid |
|---|---|---|---|---|
| 0 | 0 | 100 | 4,000 | 1 |
| 1 | 0 | 201 | 4,000 | 1 |
| 2 | 0 | 202 | 4,000 | 0 |
| 3 | 1 | 500 | 3,500 | 1 |
| ⋮ | ⋮ | ⋮ | ⋮ | ⋮ |
| n | m | x | SPT | 1 |

FIG. 3B

MEDIA BASED CACHE FOR DATA STORAGE DEVICE

BACKGROUND

Data Storage Devices (DSDs) are often used to record data onto or to reproduce data from a storage media. One type of storage media includes a rotating magnetic disk where a magnetic head of the DSD can read and write data in tracks on a surface of the disk, such as in a Hard Disk Drive (HDD).

In the case of an HDD or other DSDs using a disk storage media, certain areas of the disk may provide for faster access when reading or writing data on the disk. For example, an Outer Diameter (OD) portion of the disk can allow for data to be read or written more quickly than at an Inner Diameter (ID) portion of the disk due to the greater circumference of the disk at the OD portion. The greater circumference at the OD portion allows for more of a track at the OD portion to be read or written for a given amount of rotation of the disk than in the shorter tracks at an ID portion of the disk.

Some DSDs with disk media can take advantage of the faster write speed by using a Media Based Cache (MBC) to quickly cache data in the MBC that is later written to its originally intended location on the disk when the DSD is not busy servicing other commands. The speed performance can be attributed to several factors. First, since data is written sequentially into an MBC regardless of their addresses, writes to the MBC can be executed with little or no seek operations, relative to writing data to their ultimate locations. Second, in some implementations, an MBC located in an OD portion may take advantage of the speed improvement discussed above.

Although this use of an MBC can generally improve the performance of a DSD in servicing commands, the performance of the DSD may change significantly when the MBC becomes full. In one aspect, the performance of the DSD is affected because new write commands can no longer be quickly written in the MBC after it is full. In another aspect, the DSD may need to take more time away from performing other commands in order to relocate data from the MBC to its originally intended location on the disk to make room in the MBC. Both of these aspects can result in a significant change in performance as seen from a host issuing read and write commands to the DSD.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 2C depicts an example arrangement where each zone has a single track for an MBC region at varying locations in the zone according to an embodiment.

FIG. 2D depicts an example arrangement where each zone has an MBC region of varying sizes and locations according to an embodiment.

FIG. 3A illustrates an example of a MBC mapping table according to an embodiment.

FIG. 3B illustrates an example of an MBC track table according to an embodiment.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Overview

Figure 1:
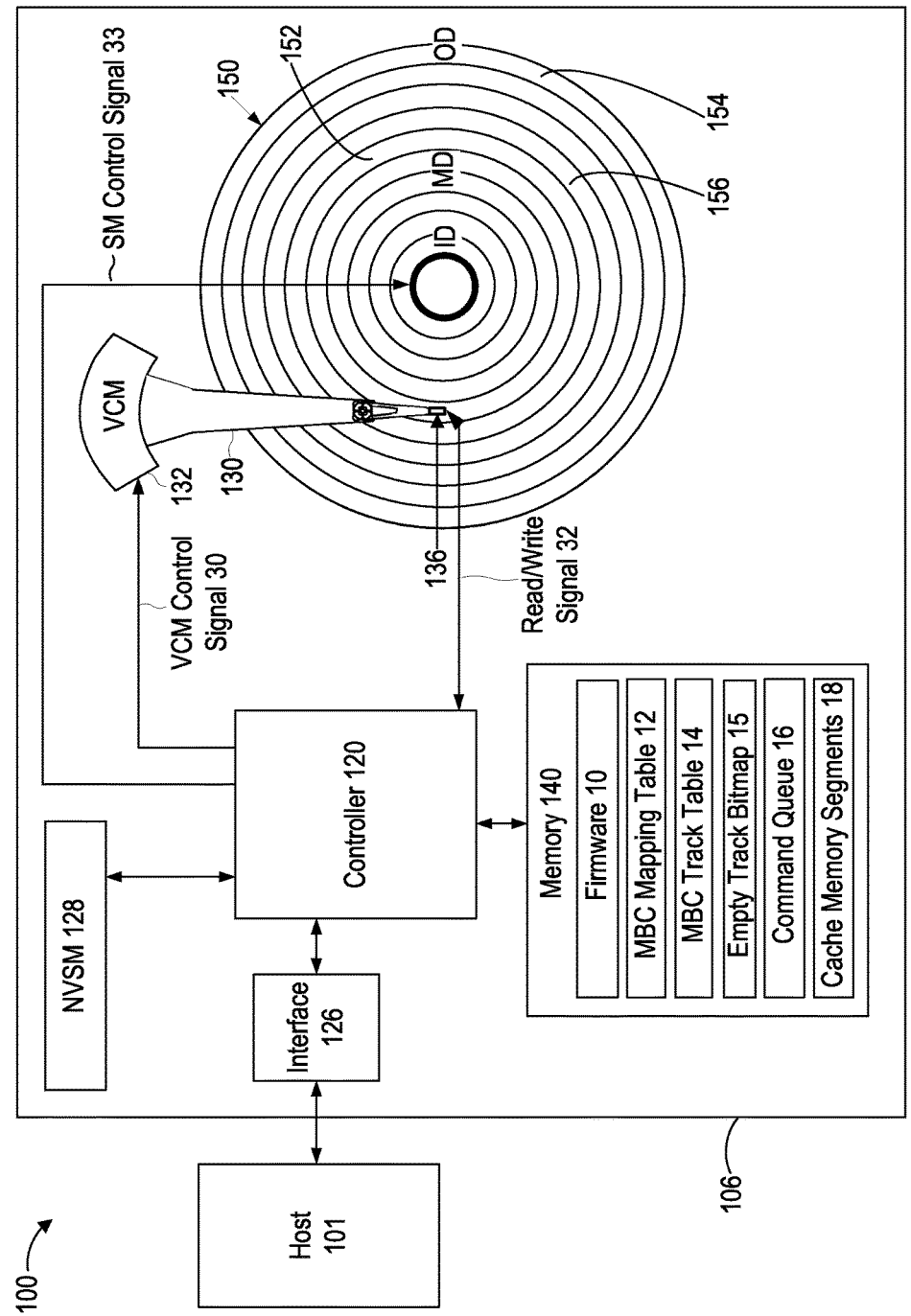
FIG. 1 is a block diagram depicting a Data Storage Device (DSD) according to an embodiment.

FIG. 1 shows system 100 according to an embodiment which includes host 101 and Data Storage Device (DSD) 106. System 100 can be, for example, a computer system (e.g., server, desktop, mobile/laptop, tablet, smartphone, etc.) or other electronic device such as a Digital Video Recorder (DVR). In this regard, system 100 may be a stand-alone system or part of a network, such as a local or wide area network, or the Internet.

As shown in the example embodiment of FIG. 1, DSD 106 includes Non-Volatile Memory (NVM) in the form of rotating magnetic disk 150 and Non-Volatile Solid-State Memory (NVSM) 128. In this regard, DSD 106 can be considered a Solid-State Hybrid Drive (SSHD) since it includes both solid-state and disk media. In other embodiments, NVSM 128 may be omitted so that the NVM of DSD 106 includes only disk storage media. In yet other embodiments, each of disk 150 or NVSM 128 can be replaced by multiple Hard Disk Drives (HDDs) or multiple Solid-State Drives (SSDs), respectively, so that DSD 106 includes pools of HDDs and/or SSDs.

DSD 106 includes controller 120 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof. In one implementation, controller 120 can include a System On a Chip (SoC).

Host interface 126 is configured to interface DSD 106 with host 101 and may interface according to a standard such as, for example, Serial Advanced Technology Attachment (SATA), PCI express (PCIe), Small Computer System Interface (SCSI), or Serial Attached SCSI (SAS). As will be appreciated by those of ordinary skill in the art, host interface 126 can be included as part of controller 120.

Host 101 communicates with DSD 106 via host interface 126 to retrieve data from and store data in DSD 106. As used herein, a host can refer to a device that is capable of issuing commands to a DSD to store data or retrieve data. In this regard, host 101 may include another storage device such as a smart DSD that is capable of executing applications and communicating with other DSDs.

The components of FIG. 1 may or may not be physically co-located. In this regard, host 101 and DSD 106 may be connected using a bus, a local area network, a wide area network, or the Internet. Those of ordinary skill in the art will also appreciate that other embodiments can include more or less than those elements shown in FIG. 1 and that the disclosed processes can be implemented in other environments. For example, other embodiments can include a different number of hosts or DSDs.

In FIG. 1, disk 150 is rotated by a spindle motor (not shown) and head 136 is positioned to read and write data on the surface of disk 150. In more detail, head 136 is connected to the distal end of actuator 130 which is rotated by Voice Coil Motor (VCM) 132 to position head 136 over disk 150 to read or write data in tracks (not shown). A servo system (not shown) of controller 120 controls the rotation of disk 150 with SM control signal 33 and controls the position of head 136 using VCM control signal 30.

As will be appreciated by those of ordinary skill in the art, disk 150 may form part of a disk pack including multiple disks that are radially aligned with disk 150. In such implementations, head 136 may form part of a Head Stack Assembly (HSA) including heads arranged to read data from and write data to a corresponding disk surface in the disk pack.

As shown in FIG. 1, disk 150 includes an Inner Diameter (ID) portion, a Middle Diameter (MD) portion, and an Outer Diameter (OD) portion. In the example of FIG. 1, Media Based Cache (MBC) region 154 is located at, for example, the OD portion for caching or temporarily storing data that is to be stored in other locations on disk 150. MBC region 154 can include one or more tracks on disk 150 that can be accessed relatively quickly due to MBC region 154 being located at the OD portion where data can typically be read and written quicker that at the MD portion or the ID portion. As used herein, a region can refer to a contiguous portion of disk 150 such as a track or a group of adjacent tracks on disk 150. In some embodiments, the MBC region is not limited to the OD portion and can be placed in other locations on the media.

Disk 150 also includes user data region 152 and MBC region 156 adjacent to user data region 152. MBC region 156 can include one or more MBC tracks used to cache data for later storage in one or more user data regions near MBC region 156 such user data region 152. User data region 152 can include a group of adjacent user data tracks for storing data received from host 101. In one implementation, user data region 152 and MBC region 156 may form a zone of tracks. As discussed in more detail below with reference to FIGS. 2A to 2D, disk 150 can include different arrangements of MBC regions and user data regions.

DSD 106 may also include NVSM 128 for storing data (e.g., in the case of a solid-state hybrid data storage device). While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

As shown in FIG. 1, DSD 106 includes memory 140, which can include, for example, a Dynamic Random Access Memory (DRAM). In some embodiments, memory 140 can be a volatile memory used by DSD 106 to temporarily store data. In other embodiments, memory 140 can be an NVM that can be quickly accessed. Data stored in memory 140 can include data read from NVM such as disk 150, data to be stored in NVM, instructions loaded from firmware 10 for execution by controller 120, and/or data used in executing firmware 10.

In the example of FIG. 1, memory 140 also stores MBC mapping table 12, MBC track table 14, empty track bitmap 15, command queue 16, and cache memory segments 18. As discussed below in more detail with reference to FIGS. 3A and 3B, MBC mapping table 12 and MBC track table 14 can provide MBC information that can indicate locations of MBC regions on disk 150 and other information pertaining to the MBC regions such as whether the data stored in the MBC regions is valid data. In the case where memory 140 is a volatile memory, mapping table 12, MBC track table 14, and/or other such data described as being resident in memory 140 can be maintained across power cycles in an NVM such as NVSM 128 or disk 150.

As discussed in more detail below with reference to FIG. 5, controller 120 can use the MBC information to determine a size of an MBC region or to assign tracks on disk 150 to an MBC region during an active time period when host commands are being performed on disk 150. In addition, empty track bitmap 15 keeps track of which tracks on disk 150 do not store valid user data so that one or more tracks can be assigned as an MBC region on the fly during operation of DSD 106.

Command queue 16 keeps track of pending commands for performing on disk 150. For example, command queue 16 can include write commands and read commands that have been received from host 101 but have not yet been performed on disk 150. In one implementation, write data that is cached in an MBC region is destaged or copied from the MBC region to its originally intended location on disk 150. A command for writing the write data from the MBC region to its intended location on disk 150 can also be included in command queue 16.

Cache memory segments 18 form a cache memory that can be used to store at least a portion of the write data for write commands before caching the write data in an MBC region. As discussed in more detail with reference to FIGS. 6 to 8 below, cache memory segments 18 may be recycled or promoted through several stages to better control the timing and the amount of write data that actually needs to be cached in one or more MBC regions on disk 150.

By providing better control of the use of MBC regions, it is ordinarily possible to reduce the likelihood that the MBC regions will become full. This can provide a more stable and predictable performance of commands on disk 150. In addition, using a portion of an available I/O bandwidth during an active time period of DSD 106 to copy write data to their corresponding write locations, or originally intended locations where the write data would have been written on disk 150 if not cached, helps prevent reaching a point where the MBC regions become full. This is in contrast to conventional media based caching where write data is copied from the MBC only during inactive or idle states of the DSD when the DSD is not performing other commands.

In another aspect of controlling the use of the MBC regions, the size and locations of the MBC regions can be dynamically assigned to allow more room to cache write data if needed. One or a combination of the above aspects for controlling the use of the MBC regions can allow for greater predictability and stability in the performance of DSD 106 than using a conventional MBC.

In operation, host interface 126 receives host read and write commands from host 101 via host interface 126 for reading data from and writing data to NVM of DSD 106. In response to a write command from host 101, controller 120 may buffer the data to be written for the write commands in memory 140.

For data to be written on disk 150, a read/write channel (not shown) of controller 120 may encode the buffered data into write signal 32 which is provided to head 136 for magnetically writing data on disk 150. A servo system of controller 120 can provide VCM control signal 30 to VCM 132 to position head 136 over a particular track for writing the data.

To read data from disk 150, the servo system positions head 136 over a particular track on disk 150. Controller 120 controls head 136 to magnetically read data stored in the track and to send the read data as read signal 32. A read/write channel of controller 120 can then decode and buffer the data into memory 140 for transmission to host 101 via host interface 126.

For data to be stored in NVSM 128, controller 120 receives data from host interface 126 and may buffer the data in memory 140. In one implementation, the data is then encoded into charge values for charging cells (not shown) of NVSM 128 to store the data.

To access data stored in NVSM 128, controller 120 in one implementation reads current values for cells in NVSM 128 and decodes the current values into data that can be transferred to host 101 via host interface 126.

MBC Region Layout Examples

Figure 2A:
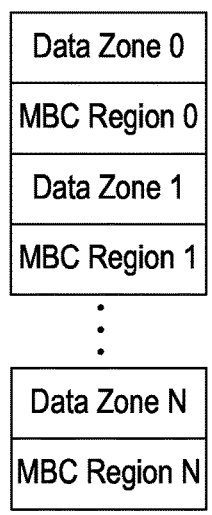
FIG. 2A depicts an example arrangement of MBC regions and data zones according to an embodiment.

FIG. 2A depicts an example arrangement of MBC regions and data zones on disk 150 according to an embodiment. As shown in FIG. 2A, each data zone, such as user data region 152 in FIG. 1, can have its own dedicated MBC region, which can include one or more MBC tracks for caching write data that is to be stored in another location (i.e., a corresponding write location) on disk 150.

In one implementation, each MBC region in FIG. 2A may be used to cache write data that is to be stored in an adjacent data zone. For example, the write data cached in MBC region 1 can include write data that is to be ultimately written in data zone 1 and the write data cached in MBC region 0 can include write data that is to be ultimately written in data zone 0. By caching the write data to be written in an adjacent zone, it is ordinarily possible to reduce the amount of time needed to destage or copy the write data from the MBC region to its final destination in the adjacent data zone.

In other implementations, the write data cached in an MBC region may not be destined for an adjacent data zone or for only one particular data zone. Instead, the write data may be cached in an MBC region that happens to be closest to a current or predicted location of head 136 so as to cache the write data in the MBC region as quickly as possible.

Figure 2B:
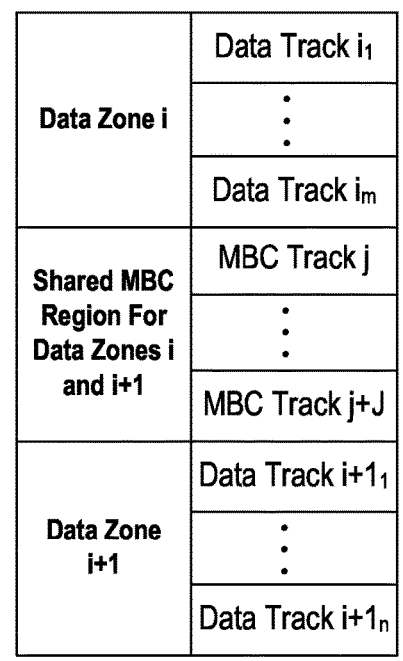
FIG. 2B depicts an example arrangement of an MBC region that is shared by two data zones according to an embodiment.

FIG. 2B depicts an example arrangement of an MBC region that is shared by two data zones according to an embodiment. As shown in FIG. 2B, the shared MBC region is located between data zone i and data zone i+1, which both use the MBC region to cache write data that is to be stored in either data zone i or data zone i+1. Sharing an MBC region as in FIG. 2B can decrease the number of MBC regions and thereby lessen the amount of MBC information such as the number of entries in MBC mapping table 12 and/or MBC track table 14. However, as with the example of FIG. 2A, a shared MBC region can still take advantage of its locality to certain data zones, or in other implementations, to a current or predicted position of head 136 to allow for faster caching in the MBC region.

FIG. 2C depicts an example arrangement where each zone has a single track MBC region at varying locations in the zone according to an embodiment. As shown in FIG. 2C, each of zones 0 to N include an MBC track that serves as an MBC region for the zone. The MBC track can be used to locally cache write data for the zone. As shown in FIG. 2C, the location of the MBC track within the zone does not need to be fixed to a particular location. For zone 0, MBC track 0 is located after the first track in the zone, data track 0. For zone 1, MBC track 0 is located after the second track in the zone, data track 1. In some implementations, the location of the MBC track can be dynamically assigned during an active period of the DSD (e.g., when the DSD is not idle or otherwise performing only background maintenance activities). The dynamic assignment of an MBC track during an active time period can allow DSD 106 to more efficiently select the location of the MBC track based on the current or predicted position of head 136 in the zone. In addition, MBC tracks can be reassigned as user data tracks after their write data has been copied to the corresponding write locations. This can allow for user data to be written in tracks in the zone that were previously assigned as an MBC region.

FIG. 2D depicts an example arrangement where each zone has an MBC region of varying size and location according to an embodiment. As with the example of FIG. 2C discussed above, each zone in FIG. 2D has its own MBC region at varying locations within the zone. However, unlike the example of FIG. 2C, the size of each MBC region may vary from zone to zone. For example, zone 0 in FIG. 2D includes a single MBC track 0 as its MBC region. Zone 1, on the other hand, uses two MBC tracks as its MBC region with MBC tracks 0 and 1.

The total number of MBC tracks per zone may have an upper limit so that the number of MBC tracks in the zone may start, for example, as a single MBC track and then increase toward the upper limit for MBC tracks in the zone as more space is needed for MBC tracks. The assignment of the new MBC tracks in the zone may be made by using empty track bitmap 15 to identify empty user data tracks in the zone. The empty user data tracks can include tracks that do not yet store any user data or that may store only invalid user data. When an empty track is assigned as a new MBC track, DSD 106 can update MBC mapping table 12 and MBC track table 14 to identify or reserve the new MBC track. In some embodiments, the dynamic re-assignment may be extended beyond a track-to-track scheme to include a portion of a track.

By maintaining an upper limit for the number of MBC tracks in a zone, it is possible to maintain a particular Logical Block Address (LBA) range or a particular number of user data tracks for the zone. However, in some implementations, it may be possible to not have an upper limit to the number of MBC tracks in a zone. In one example, a zone with a large number of empty user data tracks where it is not expected to have user data written soon, may allow for borrowing one or more empty user data tracks to temporarily use as MBC tracks if needed. The write data cached in the borrowed MBC tracks (or other MBC tracks in the zone) could then be given a higher priority for destaging or copying its write data to the corresponding write locations to return or reassign MBC tracks back into user data tracks to maintain an otherwise required number of user data tracks or LBAs for the zone.

Although the examples of FIGS. 2C and 2D depict one MBC region per zone with one or more contiguous MBC tracks, other embodiments may include multiple MBC regions that are spaced apart within a zone with its MBC tracks separated by user data tracks.

MBC Management Examples

FIG. 3A illustrates an example of MBC mapping table 12 according to an embodiment. As discussed above, DSD 106 may use MBC information such as MBC mapping table 12 or MBC track table 14 to identify the locations of the MBC regions or cached write data on disk 150 and to dynamically assign or reassign MBC regions and user data regions either during an idle state of DSD 106 or during an active time period. Each row in MBC mapping table 12 provides information for write data that has been cached in an MBC region on disk 150.

MBC mapping table 12 shown in FIG. 3A includes LBA ranges that identify the write data cached in the MBC regions in a logical addressing used by host 101. In other embodiments, an initial LBA may be provided with a length to indicate a range of LBAs for the cached write data rather than a beginning and ending LBA.

The Physical Block Address (PBA) in mapping table 12 identifies a physical location on disk 150 where the write data is cached with a zone ID identifying a zone of tracks on disk 150 and a Starting Absolute Block Number (SABN) that identifies a starting location of where the write data is cached in an MBC region. In other embodiments, the PBA may instead provide a range of PBAs for the cached write data with or without a zone ID.

The validity entry in MBC mapping table 12 indicates whether the cached write data is valid or if the write data has become obsolete due to, for example, a deletion of the write data, the write data being overwritten by newer write data for the LBA, or if the write data has already been destaged or copied to a corresponding write location on disk 150.

In other embodiments, such as when the locations of the MBC regions on disk 150 are fixed, mapping table 12 may form part of a mapping table used for both user data regions and MBC regions. In such an embodiment, the mapping table may provide for an LBA to PBA translation for all of the logically addressed data stored on disk 150. The size of a separate MBC mapping table 12 for just the cached write data is relatively small when compared to a full mapping table for all of the user data on disk 150 since a small portion of disk 150 is typically used for caching write data.

FIG. 3B illustrates an example of MBC track table 14 according to an embodiment. As noted above, if the MBC regions on disk 150 are at fixed locations, MBC track table 14 may not be needed.

As shown in FIG. 3B, MBC track table 14 includes a track ID, a zone ID, a track number, a number of blocks for the MBC track, and an indication of whether the data stored in the MBC track is valid. Each row in MBC track table 14 provides information about a different MBC track in the MBC regions on disk 150.

The track ID is a sequential ID number that identifies the MBC tracks of the MBC regions. In some embodiments, the track ID may be omitted and a different track identifier such as the track number shown in FIG. 3B may be used to identify the MBC tracks of the MBC regions.

The zone ID indicates the zone where the MBC track is located and the track number provides an absolute track number for the MBC track. For example, The track numbers can be counted sequentially from a first surface of disk 150 to a second surface of disk 150 or from surface to surface of multiple disks if disk 150 is in a disk pack of multiple disks. In some embodiments, DSD 106 can assign MBC tracks or convert empty or invalid user data tracks to MBC tracks on the fly by calculating a track number for the MBC track based on the layout of disk 150. Controller 120 may also use empty track bitmap 15 to identify a nearby empty data track that can be used as an MBC track.

The blocks entry indicates a number of valid Sectors Per Track (SPT) by removing any bad or defective sectors that may be located in a track. This value can be used to help determine the storage capacity of a particular MBC track. The validity indicator in MBC track table 14 can be used in a similar manner as the validity indicator in MBC mapping table 12 to indicate whether the write data stored in an MBC track is valid. However, unlike the validity indicator of MBC mapping table 12, the validity indicator of MBC track table 14 provides a track level indication of validity.

The starting writing position of an MBC track can be at any sector along the MBC track to avoid a rotational delay in waiting for disk 150 to rotate to a particular sector in the MBC track. As discussed above, an MBC region may also include one or more contiguous MBC tracks.

Figure 4A:
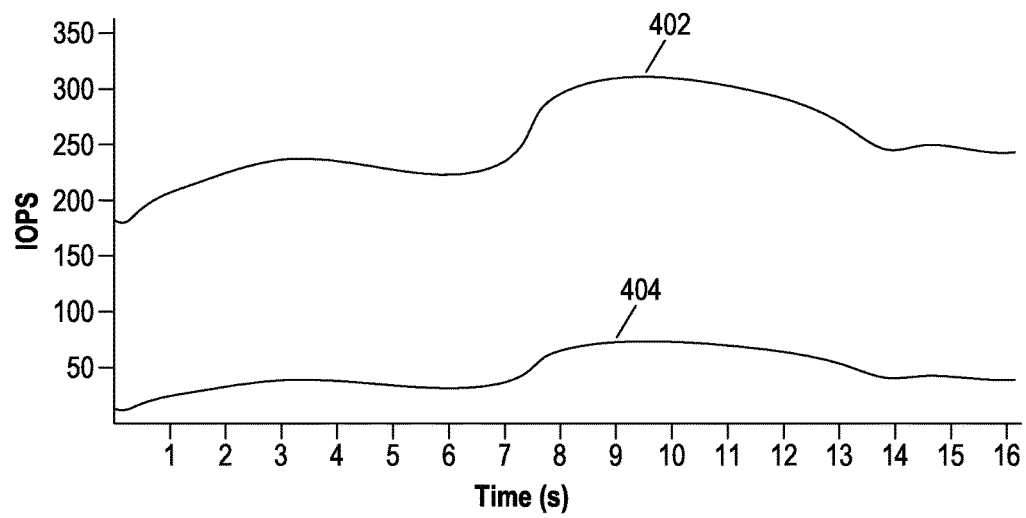
FIG. 4A illustrates an example of a portion of an I/O bandwidth in terms of Input/Output Operations Per Second (IOPS) that is used to copy cached write data according to an embodiment.

FIG. 4A illustrates an example of a portion of an I/O bandwidth in terms of Input/Output Operations Per Second (IOPS) that is used to copy cached write data according to an embodiment. As shown in FIG. 4A, a total available I/O bandwidth is illustrated over a period of time with line 402. This line represents a total rate of input/output operations that can be performed by DSD 106 on disk 150 during an active time period where DSD 106 is servicing commands from host 101 on disk 150.

The input/output operations that DSD 106 can perform includes read and write commands on disk 150, and the I/O bandwidth can vary depending on the workload. For example, the number of possible IOPS may be higher when the operations are more sequential or located closer together on disk 150. In another example, the number of IOPS that are possible may be lower when the operations are spread out across disk 150 or are commands for smaller amounts of data.

A portion of the total I/O bandwidth 402 is shown in FIG. 4A with line 404, which represents the portion of the total I/O bandwidth 402 that is used for copying or destaging cached write data to corresponding write locations on disk 150. In some implementations, this portion of the total I/O bandwidth can be reserved, for example, as a percentage of the total I/O bandwidth.

In other implementations, portion 404 may vary to adjust a rate of copying to decrease or increase a number of pending commands in command queue 16. For example, a queue depth or number of pending commands in command queue 16 may be increased by increasing the amount of write data to be copied from MBC regions to other locations on disk 150. This increase in queue depth can improve a performance efficiency of DSD 106 by providing more commands that can be scheduled or reordered in accordance with a Rotational Position Optimization (RPO) algorithm that orders the pending commands to reduce an overall distance that head 136 would need to travel to perform the pending commands. In other words, with more commands, an RPO algorithm can save more time in performing the commands by more efficiently arranging the order of the commands. The queue depth may also be decreased by decreasing the amount of write data to be copied from the MBC regions in response to an increase in host commands being received. The decrease of the queue depth can allow DSD 106 to maintain a minimum quality of service or level of performance in completing the other pending commands.

In addition, the amount of write data that is copied from the MBC regions can depend on the available capacity of the MBC regions for caching more write data. For example, the portion 404 may be a higher percentage of the total I/O bandwidth 402 when the available storage capacity of the MBC regions reaches an upper threshold before running out of space (e.g., 95% of MBC regions are full of valid data). On the other hand, portion 404 may be reduced or stopped when the available storage capacity of the MBC regions reaches a lower threshold where the MBC regions have a relatively large available storage capacity (e.g., 95% available) for caching more write data.

By using a portion of an I/O bandwidth to copy data from the MBC regions during an active time period (i.e., as a foreground activity), it is ordinarily possible to avoid running out of space in the MBC regions. As noted above, running out of space for a media based caching can greatly reduce a rate of performance of new host commands for disk 150. Although using a portion of the I/O bandwidth during an active time period may slightly reduce the performance of DSD 106 during the active time period, using the I/O bandwidth during the active time period as opposed to only during idle times can provide a more predictable and consistent performance of DSD 106 by usually avoiding situations where the MBC regions become full.

Although FIG. 4A only shows the use of the I/O bandwidth during an active time period, DSD 106 may also use periods of inactivity (i.e., when there are no pending host commands) to copy write data to corresponding write locations on disk 150. This can further reduce the likelihood of running out of space in the MBC regions. Along these lines, as the amount of the I/O bandwidth 402 that is used for new host commands decreases, portion 404 may increase to take advantage of the extra available I/O bandwidth that is not being used to service new host commands.

Figure 4B:
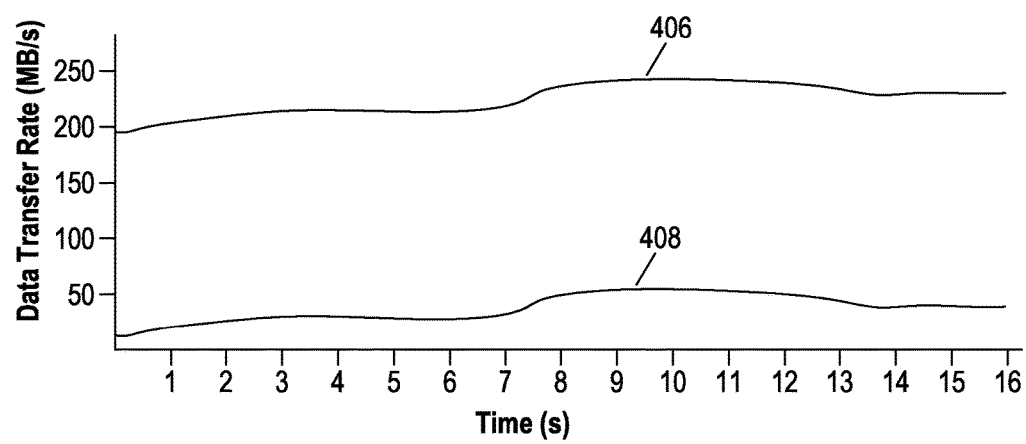
FIG. 4B illustrates an example of a portion of an I/O bandwidth in terms of a data transfer rate that is used to copy cached write data according to an embodiment.

FIG. 4B illustrates an example of a portion of an I/O bandwidth in terms of a data transfer rate that is used to copy write data from at least one MBC region according to an embodiment. As with the example of FIG. 4A, a portion 408 of a total I/O bandwidth 406 is used to copy the data from the MBC regions during an active time period when DSD 106 is servicing host commands from host 101. The I/O bandwidth of FIG. 4B is expressed in terms of a data transfer rate of MB/s rather than a number of IOPS. Although the total available I/O bandwidth (e.g., line 402 or 406) and the portion used to copy cached write data (e.g., line 404 or 408) appear to trend together in both FIGS. 4A and 4B, in practice, they may not be correlated as such due to various control mechanisms discussed herein.

Figure 5:
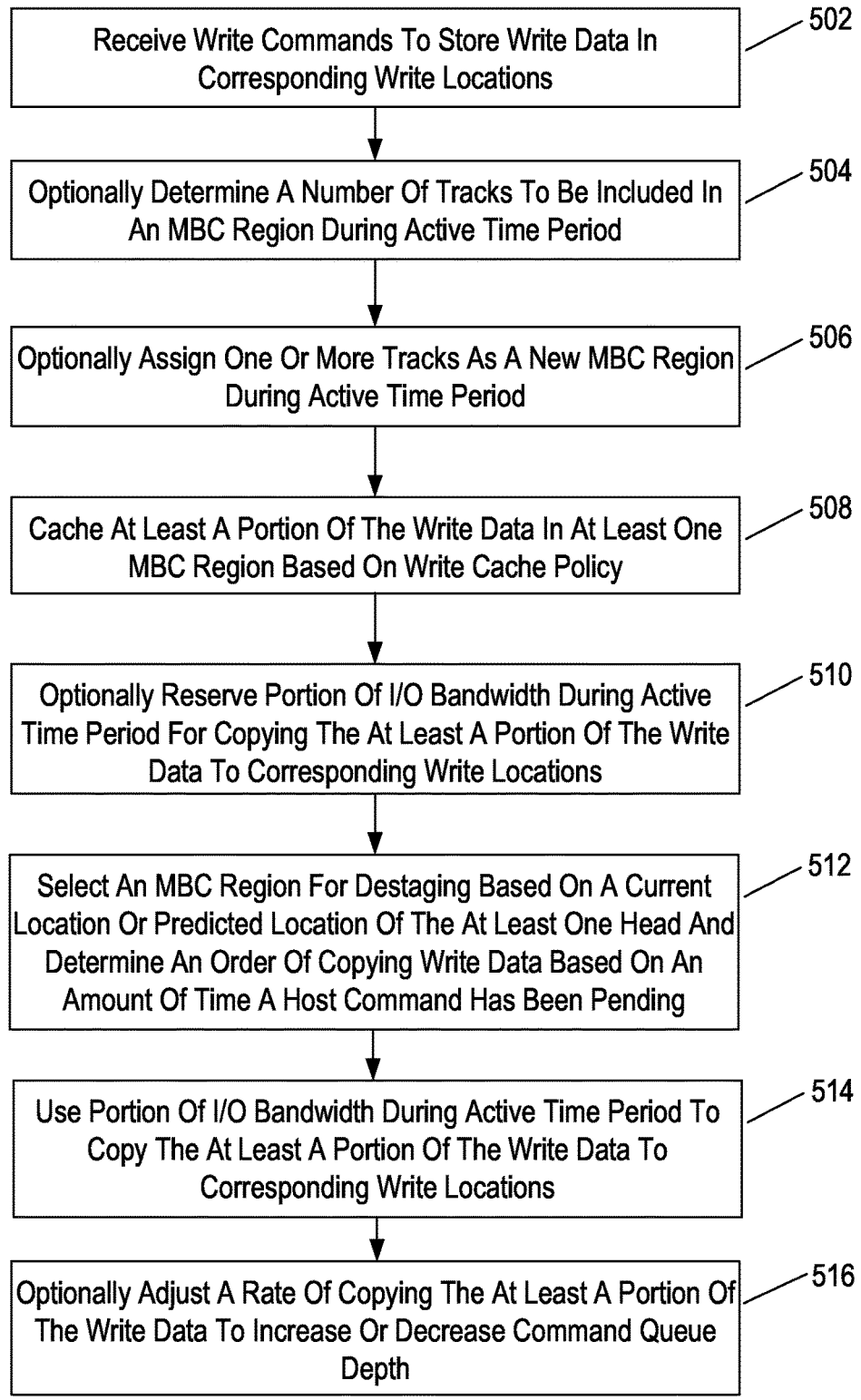
FIG. 5 is a flowchart for a write cache process using at least one MBC region according to an embodiment.

FIG. 5 is a flowchart for a write cache process using at least one MBC region according to an embodiment. The process of FIG. 5 can be performed by controller 120 executing firmware 10.

In block 502, controller 120 receives write commands from host 101 to store write data in corresponding write locations on disk 150. The write commands received from host 101 can specify LBAs for the write data included with the command. The received write data may initially be stored in memory 140 and the write command added to command queue 16.

In block 504, controller 120 optionally determines a number of tracks to be included in an MBC region during an active time period when DSD 106 is performing host commands on disk 150. The size of an MBC region may be varied to improve the flexibility of the MBC regions to accommodate more data if needed or to provide for locations of MBC regions that allow for faster caching or destaging of the cached write data.

As noted above, in some embodiments, the sizes and/or the locations of the MBC regions may be fixed. In such embodiments, block 504 is omitted. In addition, other embodiments may determine the size and/or location of MBC regions during an inactive time period of DSD 106. The determination of the number of tracks to be included in an MBC region in block 504 can be made using empty track bitmap 15, for example, to compare a size of write data to be cached with the number of available tracks in a particular zone. The MBC information of MBC mapping table 12 and MBC track table 14 can also be updated in block 504 to include additional MBC tracks.

In block 506, controller 120 optionally assigns one or more tracks as a new MBC region during the active time period. As with block 504, the assignment of a new MBC region can allow for more write data to be cached or provide a more convenient location for caching write data in terms of the time it takes to cache the write data or to access the write data after it has been cached. In one example, the new MBC region can be assigned based on a current or predicted location of head 136 and with reference to empty track bitmap 15. This can allow for write data to be quickly cached in a new MBC track that is near the current location or a location where head 136 will soon travel. Controller 120 can update MBC mapping table 12 and MBC track table 14 to account for the new MBC region.

In some embodiments, controller 120 may also assign or reassign an MBC region or a portion of an MBC region as a user data region for storing user data instead of caching write data. An MBC region or portion of an MBC region may be reassigned as a user data region if, for example, the write data in the MBC region is no longer valid or the MBC region is unused and there is a need to store additional user data in a particular zone.

In block 508, at least a portion of the write data received in block 502 is cached in at least one MBC region based on a write cache policy. The write cache policy is used by controller 120 to determine which write data is eligible for caching in the MBC regions. In one example, the write cache policy can indicate that write data below a certain size should be cached and/or that write data that is not sequentially addressed with other received write data (i.e., a random write) should be cached. In other examples, the write cache policy may consider whether the write data is to be written in a location near a current position of head 136 or a priority level for the received write data indicating that the write data should be cached in a portion of the disk for faster read access or for redundancy.

In caching the write data, controller 120 may use MBC information to find an MBC region for caching the write data that is either close to a current or predicted position of head 136 or near the final or intended location on disk 150 for storing the write data. In one implementation, controller 120 may search MBC track table 14 to identify an MBC track to cache the write data. The write data is then written in the identified MBC region.

If head 136 is idle (i.e., not performing any commands on disk 150) the identified MBC region can be the closest MBC region to the current position of head 136. If head 136 is not idle, controller 120 may first determine if there will be any other commands that will need to be performed before caching the write data in an MBC region. For example, if there is a read command or other write command that will timeout before caching the write data in an MBC region, controller 120 will calculate a location for head 136 after finishing the command about to timeout and identify an available MBC region closest to the calculated position. If there are no other commands that will need to be performed before caching the write data in an MBC region, the calculated position of head 136 can be the location where the command that is currently being performed will end.

In block 510, controller 120 optionally reserves a portion of the I/O bandwidth during the active time period for copying at least a portion of the write data cached in the MBC regions to their corresponding write locations on disk 150. As discussed above with reference to FIGS. 4A and 4B, the determination of how much write data to destage or copy during the active time period can be based on a certain percentage of a total I/O bandwidth or varying factors such as the amount of available storage capacity in the MBC regions or a number of commands queued for performance in command queue 16.

In block 512, controller 120 selects an MBC region to destage based on a current location or a predicted location of head 136 so as to reduce the amount of distance that head 136 would need to travel in destaging the write data. In addition, controller 120 in block 512 can determine an order of copying the write data based on an amount of time a host command has been pending or other considerations such as the final location for storing the write data on disk 150. In this regard, controller 120 may prioritize the copying of write data for write commands that were received before other write commands or write data with corresponding write locations near a current or predicted position of head 136.

In block 514, controller 120 uses a portion of an I/O bandwidth (e.g., portions 404 or 408 in FIGS. 4A and 4B) during an active time period to copy the valid write data to corresponding write locations on disk 150. The MBC region may first be read by head 136 and the valid write data stored temporarily in memory 140 before writing the valid write data in the corresponding write location on disk 150.

As discussed in more detail below with reference to FIGS. 6 to 8, controller 120 may use cache memory segments 18 of memory 140 to first cache some or all of the write data before caching the write data in an MBC region. The write data stored in cache memory segments 18 may then be directly written to its corresponding write location on disk 150 without having to read the write data from the MBC region. As discussed below, controller 120 may also use cache memory segments 18 to help control the rate that write data is cached in the MBC regions.

In block 516, controller 120 may optionally adjust a rate of copying the write data to increase or decrease a command queue depth of command queue 16. As discussed above, this adjustment may be made to increase the available storage capacity of the MBC regions, maintain a certain quality of service in performing host commands, or to improve the performance of commands on disk 150 through the use of an RPO algorithm.

In some embodiments, certain blocks described above may be performed independently of the performance of other blocks shown in FIG. 5. For example, one or more of blocks 504, 506, 510, 514, and 516 can be performed on its own without necessarily being triggered by receiving the write commands as described above for block 502.

MBC Management Examples Using Cache Memory

Figure 6:
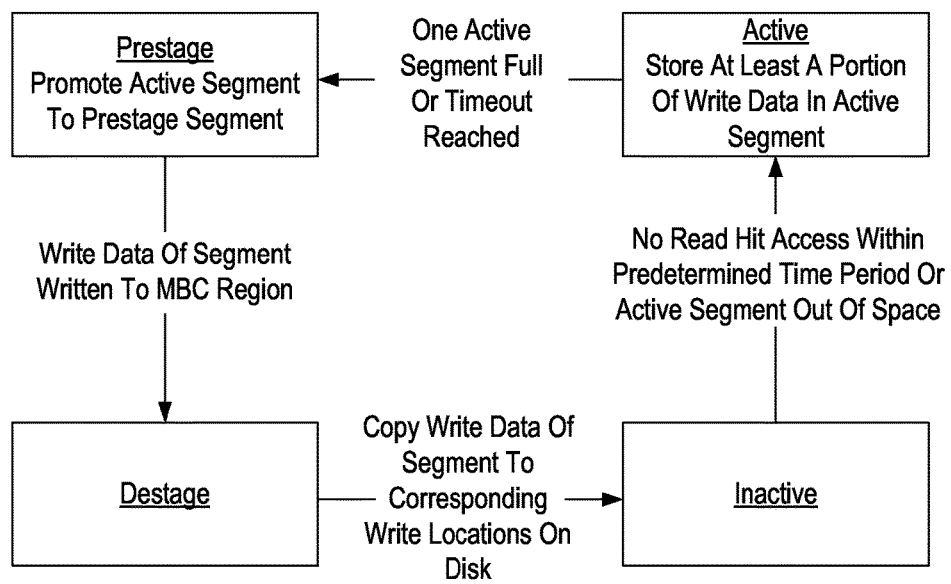
FIG. 6 illustrates the promotion of segments of a cache memory for caching write data stored in the segments in at least one MBC region according to an embodiment.

FIG. 6 provides an example of the promotion of cache memory segments 18 of memory 140 in an embodiment where memory 140 is used for storing write data before caching the write data in an MBC region or writing the write data to its corresponding write location on disk 150. As shown in FIG. 6, cache memory segments 18 can be in one of several stages and may be recycled for storing write data that is then cached in an MBC region and/or written to its corresponding write location on disk 150.

In one embodiment, using cache memory segments 18 can reduce the need to read write data from MBC regions when copying the write data to its corresponding write location. In other words, write data can be stored in a cache memory segment 18 and then used to both copy the write data to an MBC region and eventually copy the write data to its originally intended location or final location on disk 150. The caching of the write data in an MBC region may then primarily serve to non-volatilely protect the write data in a case where memory 140 is a volatile memory. In some situations, certain write data may be copied directly to its intended location from a cache memory segment 18 without first being stored in an MBC region.

In one implementation, cache memory segments 18 may be organized in clusters that have a total fixed data size with each segment within a given cluster having a varying data size that is bounded by an upper threshold data size. This can ordinarily allow the segments 18 to store different amounts of write data as needed. In one example, the upper threshold size for a segment can correspond to approximately the amount of data that can be stored in one track on disk 150. When writing the data from the segment to the MBC region, the write data can be compacted so that it is slightly less than one track size to allow for segment summary information to be added, as discussed below with reference to MBC log requests.

A data size allocated for all of the MBC regions may correspond to a data size of all of the cache memory segments 18. In one example, the size of the MBC regions may be equal to the total size of cache memory segments 18. However, by allocating more capacity to the MBC regions, such as 1.5 or two times the total size of cache memory segments 18, it is ordinarily possible to allow for more flexibility in locating the MBC regions throughout disk 150 to improve a performance of DSD 106 when caching write data in the MBC regions or destaging write data from the MBC regions.

In FIG. 6, a cache memory segment 18 is promoted from being in an inactive stage or an inactive segment to an active stage or active segment that stores new write data. An inactive segment may still store invalid data or data that was previously copied to a corresponding write location on disk 150.

In the example of FIG. 6, an inactive segment is promoted to an active segment for storing new write data if there have not been any read accesses to the inactive segment (i.e., a read cache hit) within a predetermined time period or if there are not enough active segments to store incoming write data. In this regard, valid write data that is stored in any of the segments can serve as a read cache for read requests. Valid write data stored in an inactive segment can usually be used to service read requests quicker than accessing the write data from an MBC region or its corresponding write location.

In one implementation, the new write data stored in an active segment includes groups small sized random write requests so that the write requests are rearranged in the active segment to become a larger write request for later writing sequentially to an MBC region as an MBC log write request. Such a collection of smaller sized write requests that are more randomly addressed can typically allow for a more efficient performance of write commands. Larger sized write requests are usually more efficiently written on disk 150 since head 136 can write more data on disk 150 than having to write multiple smaller sized portions of data. In addition, write data that is more sequentially addressed can generally be written near the same physical location on disk 150 so as to avoid having to move head 136 across large portions of disk 150. Grouping the smaller sized and/or more randomly addressed write requests into one MBC log write request that can be written at one time in an MBC region can ordinarily save time in performing write requests on disk 150.

When new write data is stored in an active segment, controller 120 may send a notification to host 101 indicating the completion of the write command if the command was sent in a Write Cache Enable (WCE) mode that allows for the reporting of the completion of the command before its write data is stored in NVM. By reporting storage of the write data when it is stored in an active segment and not waiting until it is stored in the MBC region or a corresponding write location, host 101 can continue to send commands to DSD 106 that may have been dependent upon the completion of the write command.

In the example of FIG. 6, an active segment is promoted to a prestage segment when the active segment becomes full (e.g., reaches an upper data size threshold for the segment) or if a timeout for active segments is reached. In addition, in some implementations, one or more active segments may be promoted to a prestage segment if a system activity level falls below a certain threshold. For example, with reference to the example of FIG. 4B, one or more active segments may be promoted to prestage segments when the host command activity level falls below a certain threshold data transfer rate. This can allow for an earlier promotion of active segments to cache more write data in MBC regions when there is additional I/O bandwidth available.

In some implementations, the timeout for active segments may be used to help protect the write data stored in the segments if memory 140 is a volatile memory. In addition, the data stored in the active and prestage segments may also be protected against a power loss by being identified as part of a Power Safe Write Buffer (PSWB) whose data can be quickly transferred to a NVM such as NVSM 128 in the event of an unexpected power loss. In such implementations, power for transferring the data of the PSWB may come from, for example, kinetic energy due to the continued rotation of disk 150 or from a capacitor of DSD 106. If a PSWB is used, controller 120 may also send a notification to host 101 indicating completion of a write command that is not WCE (i.e., a command that is Write Cache Disabled (WCD)) when storing the write data in an active segment since the write data is ordinarily protected against loss by the use of the PSWB. Controller 120 would also send a completion notification for any WCE commands when storing their write data in active segments as discussed above.

At any given time, there may be multiple prestage segments with write data that is ready to be cached in an MBC region. Controller 120 can select a prestage segment to cache its write data in an MBC region based on one or more destage conditions so as to determine an order for caching the write data in the MBC regions. The destage conditions can include, for example, one or more of an amount of write data stored in the segment, an amount of time that the write data has been stored in the segment, or the number of pending write commands with new write data that is waiting to be stored in active segments.

The write data of one or more prestage segments may be formatted by controller 120 as a single MBC log write request so that the write data can be written as a single write in the MBC region. The MBC log write request can include a segment summary to record information about the write data being written in the MBC region including, for example, a starting LBA, PBA, and size of the segment, together with a timestamp of when the segment was written in the MBC region. The segment summaries can be located, for example, before or after their corresponding segment in the MBC region. In one example, each segment in the MBC log write request is followed by its segment summary when written in the MBC region.

The segment summaries in the MBC regions can be used to recover MBC information such as MBC mapping table 12 in the event of an unexpected system crash. For example, part of a crash recovery process can include checking a summary table that is stored in an NVM that identifies which segments of MBC log write requests written in MBC regions store valid write data (e.g., data that has not been overwritten or copied to a corresponding write location on disk 150). The segment summaries for the segments storing valid write data can then be read from the MBC regions to rebuild MBC mapping table 12.

The MBC log write requests can be added as commands in command queue 16, but may not be performed immediately after entering command queue 16. In one implementation, controller 120 checks whether there are any other commands in command queue 16 that are about to timeout or that will timeout if they are executed after the MBC log write request. If so, controller 120 can perform those commands first to maintain a certain quality of service or maximum amount of time for performing the commands in command queue 16.

As noted above, controller 120 may also select an order for performing commands in command queue 16 based on a current or predicted location of head 136. In one implementation, controller 120 executes a disk scheduler module of firmware 10 that determines an order for executing the commands in command queue 16 based on a current or predicted location of head 136, a priority for the commands, and a timeout condition for the commands. The disk scheduler module can implement an RPO algorithm as discussed above to reduce an overall amount of distance traveled by head 136 in performing the commands in command queue 16.

After the write data for the selected segment has been copied to an MBC region, the segment becomes a destage segment that is ready to have its write data copied to the corresponding final write location on disk 150. The write data from the destage segment may not be written immediately. In this regard, copying the write data from the destage segment to its corresponding write location may have a lower priority than performing other commands such as read commands, MBC log write requests, and other write commands that did not meet the write cache policy.

In one example, host write commands and MBC log write requests are given the same priority for performance ahead of the performance of host read commands and copying cached write data to corresponding write locations. In addition, commands pending in command queue 16 that are about to timeout may be given a higher priority for performance over host write commands and MBC log write requests. The performance of host read commands can have a higher priority for performance over copying write data from a destage segment to its corresponding write location.

In one implementation, the priorities for the different types of commands can be set by using different timeout values for the different types of commands. For example, host write commands and commands to copy write data to MBC regions can have a higher priority by having a shorter timeout value (e.g., 50 ms) than host read requests (e.g., 200 ms) and destage write requests (e.g., 600 ms).

This aging of commands through different timeout values can be implemented using an RPO algorithm as noted above to determine an order for performing commands on disk 150. For example, DSD 106 may receive a first read command for data stored at an OD portion of disk 150 and a second read command 1 ms later for reading data stored at an ID portion of disk 150. When the second read command is received there may be 256 write commands stored in prestage cache memory segments 18 that are ready to be cached in MBC regions near the OD portion of disk 150. However, the predicted time to complete the first read command and perform the 256 write commands can be 700 ms. If read commands have a timeout value of 200 ms, controller 120 would then perform the first read command and some of the 256 write commands before servicing the second read command before reaching its 200 ms timeout value.

The timeout values may also be adjusted to change the priorities for performing the different types of commands. In one example, if the available capacity of cache memory segments 18 is almost full, the timeout value for destage commands can be decreased to raise the priority for their performance and free up more space in cache memory segments 18.

In a case where there may be a high amount of write data received in a short period of time (e.g., a high write burst), some of the destage segments may be converted to active segments before their write data is written to the corresponding write locations on disk 150. In such a case, this write data is later copied from one or more MBC regions to the corresponding write locations by first reading the cached write data from the one or more MBC regions before writing the write data to the corresponding write locations. In this regard, an MBC region or an MBC track can be read in one batch and a closest MBC region or MBC track can be selected for reading to quickly free up segments.

In selecting the next command from command queue 16 to perform on disk 150, controller 120 in one implementation uses a weighted equation such as Equation 1 below to select a command to perform from command queue 16.

$$x_{i=1,\ldots n} = \alpha(t_i - t_{i0}) + \beta \bar{t}_i \qquad \text{Equation 1}$$

In Equation 1 above, i is an index for a command in command queue 16, $t_i$ is a current time since receiving the command (e.g., 100 ms), $t_{i0}$ is a timeout value for the command (e.g., 200 ms), $\bar{t}_i$ is an estimated positioning or access time for performing the command, and $\alpha$ and $\beta$ are weighting coefficients to place more emphasis on either the timeout value or the time to complete the command, with $\alpha + \beta = 1$. In such an example, controller 120 would pick the command with the lowest value for x.

A weighted equation such as Equation 1 can be used to balance the considerations of completing commands before a desired timeout value and selecting commands that can be performed closer to a current or predicted location of head 136. The values of $\alpha$ and $\beta$ can also be adjusted by controller 120 depending on the workload. For example, the value of $\alpha$ can be increased when there are more MBC log write requests in command queue 16 so that a higher priority is given to performing commands based on their locality. Other implementations may use a different method of ordering the performance of commands.

Figure 7:
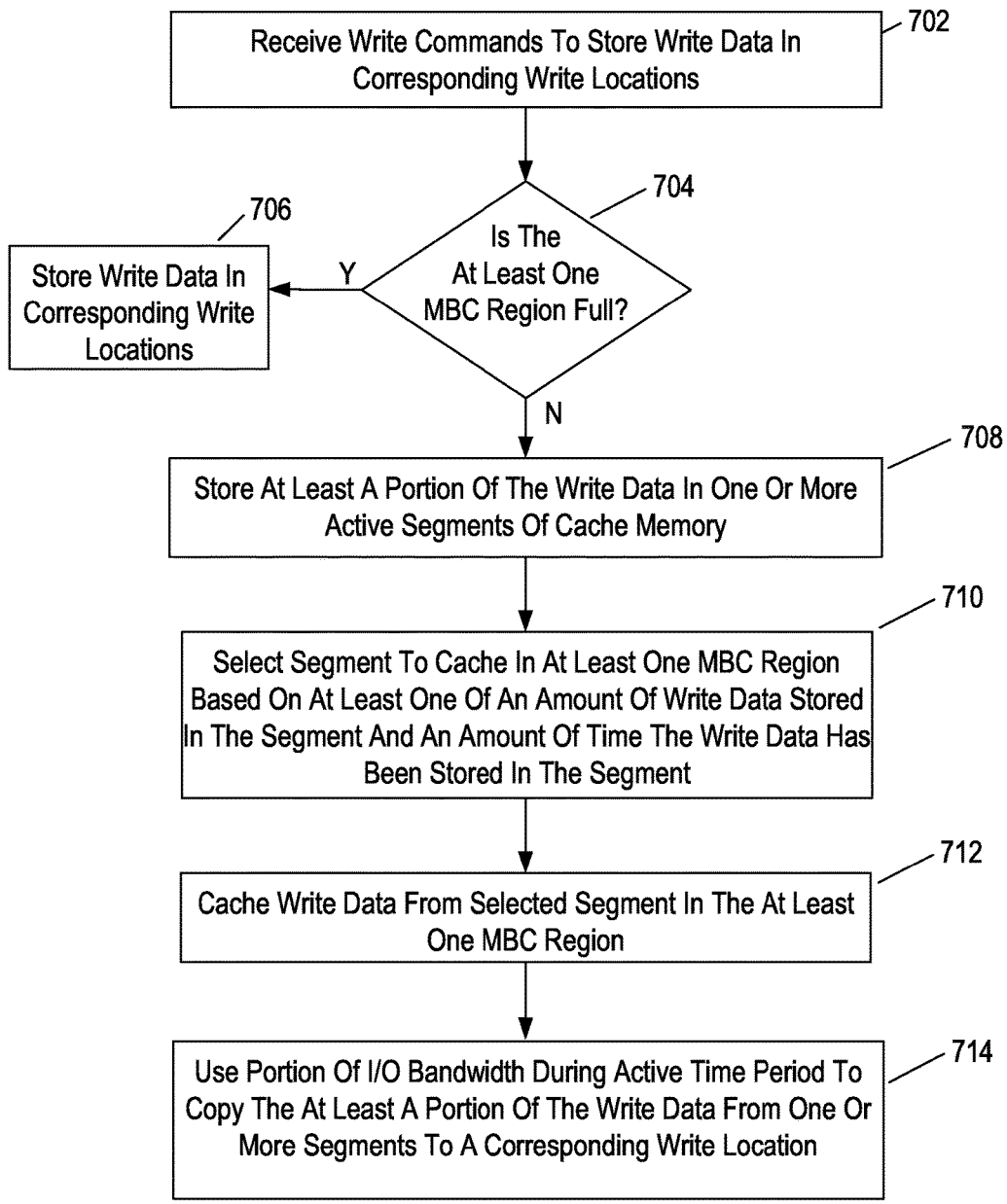
FIG. 7 is a flow chart for a write cache process using segments of a cache memory and at least one MBC region according to an embodiment.

FIG. 7 is a flow chart for a write cache process using cache memory segments 18 and at least one MBC region according to an embodiment. The process of FIG. 7 can be performed by controller 120 executing firmware 10.

In block 702, controller 120 receives write commands to store write data in corresponding write locations on disk 150. In block 704, controller 120 determines whether the MBC regions on disk 150 are full. If so, in block 706, the write data is stored in their corresponding write locations on disk 150 without using cache memory segments 18 or the MBC regions on disk 150. Controller 120 in block 704 may also consider whether a new MBC track or MBC region can be assigned using one or more empty user data tracks or a user data tracks that store invalid data. If there is space for a new MBC track, controller 120 may instead determine that the MBC regions are not full in block 704.

If it is determined in block 704 that there is space available in one or more MBC regions, controller 120 in block 708 stores at least a portion of the write data in one or more active cache memory segments 18 of memory 140, which serves as a cache memory. The write data stored in the one or more active cache memory segments 18 can include write data for write commands that meet a write cache policy. The write cache policy can consider criteria such as whether the write data for the write command is below a threshold data size or whether the write data is for logical addresses that differ from another write command by more than a certain number of logical addresses (i.e., a random write). As discussed above with reference to FIG. 6, the one or more active segments may be promoted from inactive segments that store invalid write data or write data that has already been copied to its corresponding write location on disk 150.

In block 710, controller 120 selects a cache memory segment 18 to cache in at least one MBC region based on at least one of an amount of write data stored in the segment or an amount of time the write data has been stored in the segment. For example, a prestage segment may be selected for caching its write data in an MBC region if the write data in the prestage segment exceeds a certain size or if the time since receiving the write data in the prestage segment has exceeded a predetermined amount of time.

In block 712, the write data from the selected prestage segment is cached in at least one MBC region. As discussed above, the write data may be compacted in an MBC log write request with a segment summary before caching the write data in an MBC region. Controller 120 also identifies an MBC region for caching the write data based on a current or predicted location of head 136.

In block 714, a portion of an I/O bandwidth is used during the active time period to copy at least a portion of the write data from one or more destage segments to a corresponding write location. By copying write data directly from cache memory segments 18 rather than from MBC regions on disk 150, it is ordinarily possible to further improve the performance of DSD 106 by shortening the time it takes to destage the write data to its corresponding write location on disk 150. More specifically, destaging the write data from cache memory segments 18 rather than an MBC region avoids having to read the write data from the MBC region before rewriting the write data in the corresponding write location.

Figure 8:
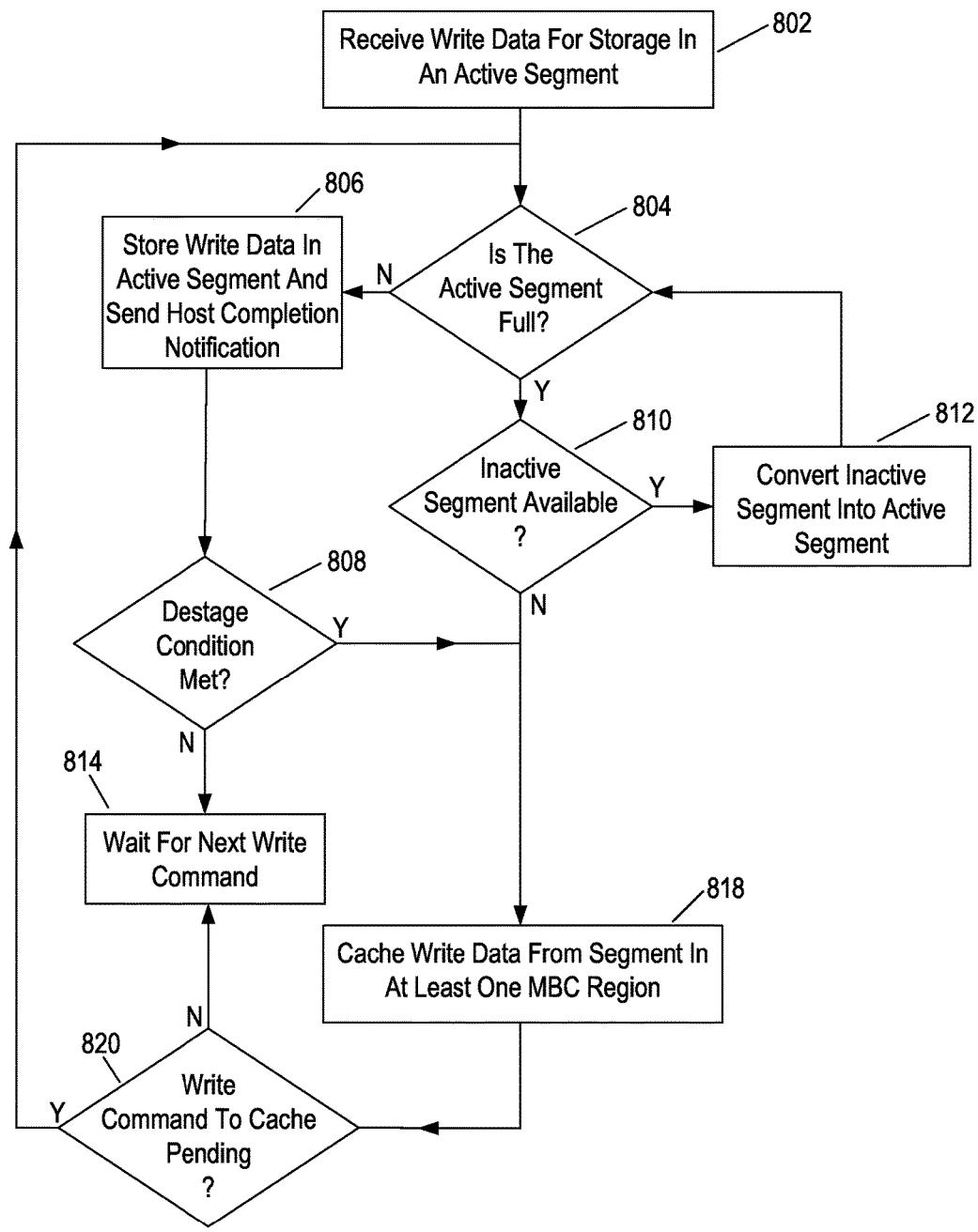
FIG. 8 is a flow chart for a segment filling process for using the segments of a cache memory according to an embodiment.

FIG. 8 is a flow chart for a segment filling process for the segments of cache memory segments 18 according to an embodiment. The process of FIG. 8 can be performed by controller 120 executing firmware 10. In block 802, the process begins when write data is received for storage in an active segment such as in block 708 of FIG. 7 described above or in the active segment stage depicted in FIG. 6 described above.

In block 804, controller 120 determines whether the active segment is full. If not, the write data is stored in the active segment in block 806 and a notification is sent to host 101 indicating completion of a write command for the write data. As discussed above, the notification may be sent in the case where memory 140 is a non-volatile memory or if the write command is WCE when memory 140 is a volatile memory. The notification may also be sent if memory 140 is a volatile memory when the write command is WCD but the active segments of cache memory segments 18 are protected by a PSWB as described above.

If it is determined in block 804 that the active segment is full, controller 120 checks in block 810 whether an inactive segment is available. If so, the inactive segment is converted into an active segment in block 812 to store the write data in block 806. On the other hand, if there are no available inactive segments, write data is cached from a segment in block 818 in at least one MBC region to provide an inactive segment for storing the write data.

As noted above, in some implementations, one or more destage segments may be used for storing new write data without copying the write data to corresponding write locations if new active segments are needed immediately. In such an example, the write data would be later copied from the MBC region where the write data was cached.

In block 808, controller 120 checks whether a destage condition is met such as whether the write data in the segment exceeds a certain size, whether a number of queued write commands has reached a threshold number of commands, or whether an active segment has reached a timeout value for being in an active segment. If so, the process proceeds to block 818 described above to cache write data from a segment in an MBC region. If a destage condition is not met in block 808, controller 120 waits for a next write command to be received in block 814.

When the caching in block 818 is completed, controller 120 in block 820 determines whether there are any write commands to cache that are pending. If there are no pending write commands that meet the write cache policy, the process of FIG. 8 proceeds to block 814 to wait for a next write command. On the other hand, if there are one or more pending write commands in block 820 that meet the write cache policy, the process returns to block 804 to determine whether an active segment is full.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A Data Storage Device (DSD), comprising:
   at least one disk including at least one Media Based Cache (MBC) region for caching data to be stored in other locations on the at least one disk; and
   a controller configured to:

receive a plurality of write commands to store write data in a plurality of corresponding write locations on the at least one disk;

cache at least a portion of the write data in the at least one MBC region based on a write cache policy for determining which write data is eligible for caching in the at least one MBC region; and during an active time period when host commands are performed on the at least one disk, reserve a portion of an I/O bandwidth for performing commands to copy the at least a portion of the write data to corresponding write locations of the plurality of corresponding write locations, wherein the I/O bandwidth includes a rate of operations performed on the at least one disk or a data transfer rate for performing operations on the at least one disk, and wherein the commands to copy the at least a portion of the write data are performed from a command queue including other commands received from a host to be performed on the at least one disk during the active time period.

2. The DSD of claim 1, wherein the controller is further configured to determine an order for caching data of the at least a portion of the write data in the at least one MBC region based on one or more destage conditions for caching the data in the at least one MBC region.

3. The DSD of claim 1, further comprising a cache memory, and wherein the controller is further configured to:

store another portion of the write data in the cache memory that meets the write cache policy for determining which write data is eligible for caching in the at least one MBC region; and write the another portion of the write data to other corresponding write locations of the plurality of corresponding write locations without caching the another portion of the write data in the at least one MBC region.

4. The DSD of claim 1, further comprising at least one head for writing and reading data on the at least one disk, and wherein the controller is further configured to select an MBC region of the at least one MBC region in which to cache the at least a portion of the write data based on a current location of the at least one head or a predicted position of the at least one head.

5. The DSD of claim 1, wherein the controller is further configured to determine an order for copying the at least a portion of the write data to the corresponding write locations based on an amount of time that a host command has been pending in the command queue for performance on the at least one disk.

6. The DSD of claim 1, wherein the disk includes a plurality of tracks for storing data, and wherein during the active time period, the controller is further configured to determine a number of tracks to be included in an MBC region of the at least one MBC region.

7. The DSD of claim 1, wherein the controller is further configured to reassign at least a portion of the at least one MBC region as a user data region for storing user data instead of caching data to be stored in other locations on the at least one disk.

8. The DSD of claim 1, wherein the controller is further configured to adjust a rate of copying the at least a portion of the write data to the corresponding write locations to increase or decrease a number of pending commands for performing on the at least one disk.

9. The DSD of claim 1, further comprising a cache memory, and wherein the controller is further configured to store the at least a portion of the write data in the cache memory before caching the at least a portion of the write data in the at least one MBC region.

10. The DSD of claim 9, wherein in copying the at least a portion of the write data to the corresponding write locations, the controller is further configured to copy the at least a portion of the write data from the cache memory to the corresponding write locations.

11. The DSD of claim 9, wherein the controller is further configured to:

store the at least a portion of the write data in one or more segments of the cache memory; and select a segment of the one or more segments to cache the write data stored in the selected segment in the at least one MBC region based on one or more destage conditions, and wherein the one or more destage conditions include at least one of an amount of write data stored in the selected segment, an amount of time that the write data has been stored in the selected segment, and a number of pending write commands with write data waiting to be stored in the one or more segments of the cache memory.

12. The DSD of claim 11, wherein the controller is further configured to promote a segment of the cache memory from an active group of segments storing write data to a prestage group of segments from which the controller selects the selected segment to cache the write data stored in the selected segment.

13. The DSD of claim 1, wherein the disk includes a plurality of tracks for storing data, and wherein during the active time period, the controller is further configured to assign one or more tracks as a new MBC region of the at least one MBC region.

14. The DSD of claim 13, further comprising at least one head for writing and reading data on the at least one disk, and wherein the controller is further configured to assign the one or more tracks as the new MBC region based on a current location or a predicted location of the at least one head.

15. The DSD of claim 1, wherein the controller is further configured to maintain MBC information indicating one or more locations for the at least one MBC region on the at least one disk.

16. The DSD of claim 15, wherein the MBC information further indicates whether data stored in the at least one MBC region is valid data.

17. A method for operating a Data Storage Device (DSD) including at least one disk for storing data, the method comprising:

receiving a plurality of write commands to store write data in a plurality of corresponding write locations on the at least one disk;

caching at least a portion of the write data in at least one Media Based Cache (MBC) region of the at least one disk based on a write cache policy for determining which write data is eligible for caching in the at least one MBC region, wherein the at least one MBC region is used to cache data to be stored in other locations on the at least one disk; and during an active time period when host commands are performed on the at least one disk, reserving a portion of an I/O bandwidth for performing commands to copy the at least a portion of the write data to corresponding write locations of the plurality of corresponding write locations, wherein the I/O bandwidth includes a rate of operations performed on the at least one disk or a data transfer rate for performing operations on the at least one disk, and wherein the commands to copy the at least a portion of the write data are performed from a command queue including other commands received from a host to be performed on the at least one disk during the active time period.

18. The method of claim 17, further comprising determining an order for caching data of the at least a portion of the write data in the at least one MBC region based on one or more destage conditions for caching the data in the at least one MBC region.

19. The method of claim 17, further comprising:
storing another portion of the write data in a cache memory of the DSD that meets the write cache policy for determining which write data is eligible for caching in the at least one MBC region; and
writing the another portion of the write data to other corresponding write locations of the plurality of corresponding write locations without caching the another portion of the write data in the at least one MBC region.

20. The method of claim 17, wherein the DSD includes at least one head for writing and reading data on the at least one disk, and wherein the method further comprises selecting an MBC region of the at least one MBC region in which to cache the at least a portion of the write data based on a current location of the at least one head or a predicted position of the at least one head.

21. The method of claim 17, further comprising determining an order for copying the at least a portion of the write data to the corresponding write locations based on an amount of time that a host command has been pending in the command queue for performance on the at least one disk.

22. The method of claim 17, wherein the disk includes a plurality of tracks for storing data, and wherein during the active time period, the method further comprises determining a number of tracks to be included in an MBC region of the at least one MBC region.

23. The method of claim 17, further comprising reassigning at least a portion of the at least one MBC region as a user data region for storing user data instead of caching data to be stored in other locations on the at least one disk.

24. The method of claim 17, further comprising adjusting a rate of copying the at least a portion of the write data to the corresponding write locations to increase or decrease a number of pending commands for performing on the at least one disk.

25. The method of claim 17, further comprising storing the at least a portion of the write data in a cache memory of the DSD before caching the at least a portion of the write data in the at least one MBC region.

26. The method of claim 25, wherein in copying the at least a portion of the write data to the corresponding write locations, the method further comprises copying the at least a portion of the write data from the cache memory to the corresponding write locations.

27. The method of claim 25, further comprising:
storing the at least a portion of the write data in one or more segments of the cache memory; and
selecting a segment of the one or more segments to cache the write data stored in the selected segment in the at least one MBC region based on one or more destage conditions, and wherein the one or more destage conditions include at least one of an amount of write data stored in the selected segment, an amount of time that the write data has been stored in the selected segment, and a number of pending write commands with write data waiting to be stored in the one or more segments of the cache memory.

28. The method of claim 27, further comprising promoting a segment of the cache memory from an active group of segments storing write data to a prestage group of segments from which the selected segment is selected to cache the write data stored in the selected segment.

29. The method of claim 17, wherein the disk includes a plurality of tracks for storing data, and wherein during the active time period, the method further comprises assigning one or more tracks as a new MBC region of the at least one MBC region.

30. The method of claim 29, further comprising at least one head for writing and reading data on the at least one disk, and wherein the method further comprises assigning the one or more tracks as the new MBC region based on a current location or a predicted location of the at least one head.

31. The method of claim 17, further comprising maintaining MBC information indicating one or more locations for the at least one MBC region on the at least one disk.

32. The method of claim 31, wherein the MBC information further indicates whether data stored in the at least one MBC region is valid data.

33. A non-transitory computer readable medium storing computer-executable instructions for operating a Data Storage Device (DSD) including at least one disk for storing data, wherein when the computer-executable instructions are executed by a controller of the DSD, the computer-executable instructions cause the controller to:
receive a plurality of write commands to store write data in a plurality of corresponding write locations on the at least one disk;
cache at least a portion of the write data in at least one Media Based Cache (MBC) region of the at least one disk based on a write cache policy for determining which write data is eligible for caching in the at least one MBC region, wherein the at least one MBC region is used to cache data to be stored in other locations on the at least one disk; and
during an active time period when host commands are performed on the at least one disk, reserve a portion of an I/O bandwidth for performing commands to copy the at least a portion of the write data to corresponding write locations of the plurality of corresponding write locations, wherein the I/O bandwidth includes a rate of operations performed on the at least one disk or a data transfer rate for performing operations on the at least one disk, and wherein the commands to copy the at least a portion of the write data are performed from a command queue including other commands received from a host to be performed on the at least one disk during the active time period.

* * * * *